United States Patent [19]
Sundstrom et al.

[11] Patent Number: 5,673,130
[45] Date of Patent: Sep. 30, 1997

[54] CIRCUITY AND METHOD OF ENCODING AND DECODING DIGITAL DATA TRANSMITTED ALONG OPTICAL FIBERS

[75] Inventors: Ray D. Sundstrom, Chandler; Daniel B. Schwartz, Apache Junction; Christopher K. Y. Chun; Stephen G. Shook, both of Gilbert, all of Ariz.

[73] Assignee: Motorola, Inc., Schaumburg, Ill.

[21] Appl. No.: 582,841

[22] Filed: Jan. 2, 1996

[51] Int. Cl.$^6$ .................................................. H04B 10/00
[52] U.S. Cl. ........................ 359/158; 375/293; 371/55
[58] Field of Search ................................ 359/154, 158, 359/161, 162; 375/292, 293, 364; 371/55, 56

[56] References Cited

U.S. PATENT DOCUMENTS

| | | | |
|---|---|---|---|
| 4,317,207 | 2/1982 | Fujimura et al. | 375/292 |
| 4,888,791 | 12/1989 | Barndt, Sr. | 375/23 |
| 5,550,864 | 8/1996 | Toy et al. | 375/293 |

Primary Examiner—Wellington Chin
Assistant Examiner—Rafael Bacares
Attorney, Agent, or Firm—Robert D. Atkins

[57] ABSTRACT

A data transmitter (12) transmits parallel data as light pulses over multiple optical channels (14). A data receiver (16) converts the light pulses back to a voltage level and compares the voltage level to a reference capacitor voltage (42). The capacitor voltage should maintain a mid-range value for proper noise margin in detecting logic ones and logic zeroes. Any long series of consecutive logic ones or zeroes causes the capacitor voltage to charge or discharge toward the same level as the data voltage, which causes data errors. To prevent the data errors, the data is encoded (18) by inverting certain bits to break up the long series of consecutive logic states. The encoding information is transmitted as a transmitted clock to the data receiver over another fiber optic channel. The decoding information is retrieved (20) so that the encoded data can be converted back to proper logic states.

22 Claims, 4 Drawing Sheets

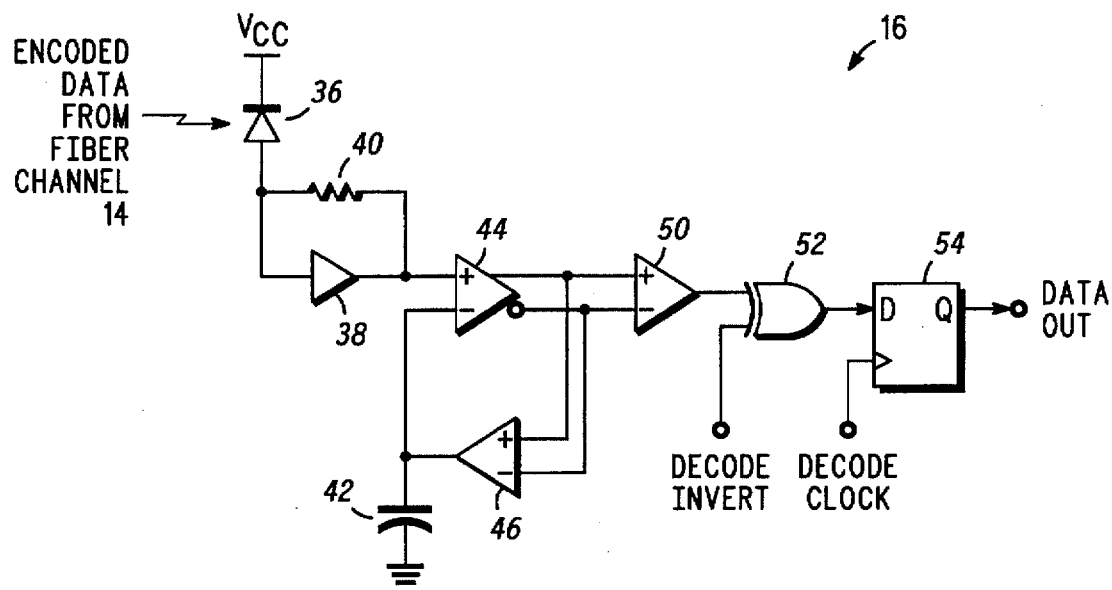
FIG. 3
FIG. 5
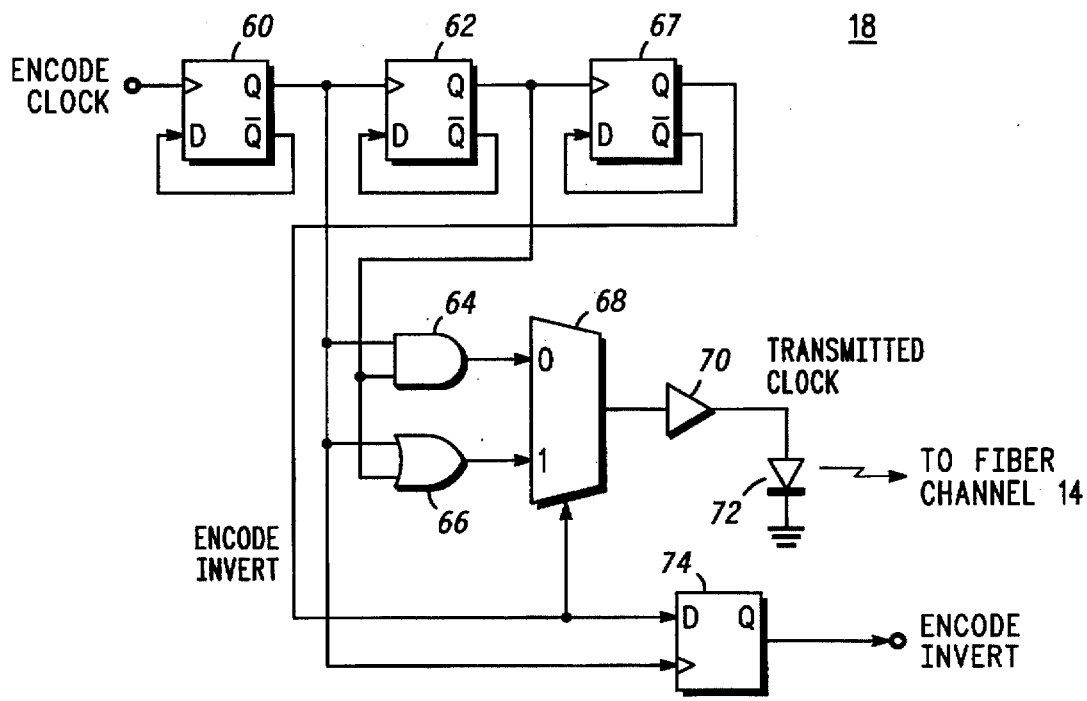

CIRCUITY AND METHOD OF ENCODING AND DECODING DIGITAL DATA TRANSMITTED ALONG OPTICAL FIBERS

BACKGROUND OF THE INVENTION

The present invention relates in general to data transmission and, more particularly, to encoding and decoding parallel data transmission.

A primary function of modern communication systems is to transmit digital data from one station to another. For example, a local computer may need to send data to a remote computer. Alternately, in a telecommunication system, voice data can be digitally encoded at one station and transmitted to a remote station. There is always a demand for higher data transmission rates to achieve greater data throughput and increase efficiency.

In the prior art, the digital data has been sent serially or in parallel along metal conductors, typically made of copper, from the local station to the remote station. Bus drivers charge and discharge the capacitance of the metal conductors to a high voltage (logic one) and a low voltage (logic zero). Data transmission along metal conductors is limited in bandwidth, i.e. number of bits transmitted per second, because of the inherit capacitance of the conductors. To increase the data transmission rate, more power is given to the bus drivers for quicker charge and discharge of the metal conductors. However, more power to the bus drivers only works to a point. The high data rates on metal conductors cause other problems such as inductive cross-talk between the conductors resulting in interference and data errors. For long distances, the data is typically converted to a serial format and transmitted through a shielded coax. In many cases, a practical limit on serial data transmission along a shielded coax over a long distance is about 100.0 megabits per second (Mbit/s).

Another type of data transmission known in the prior art is by optical fibers. In a fiber optic data transmission system, serial digital data drives a transmitting laser diode that generates light pulses. The light pulses travel along a thin glass or plastic fiber. A photo diode at the end of the optical fiber receives the light pulses and converts the signal back to an electrical current which in turn is converted to a voltage by a transimpedance amplifier. The data voltage is compared to a reference voltage to determine whether the data is logic one or logic zero. There is no capacitance in the optical fibers to overcome as with metal conductors. Consequently, data can travel serially through optical fiber at much higher data rates, often greater than 1.0 gigabits per second (GBit/s). Parallel data is typically converted to a serial data stream for transmission along the single optical fiber and then converted back to parallel format at the receiving end.

For each channel, the data receiver must convert the light pulses back to a voltage level and compare the voltage level to a reference voltage, which is typically stored on a capacitor. The reference voltage should maintain a mid-range value for proper noise margin where the data voltage is clearly above (logic one) or below (logic zero) the reference voltage. Any long series of consecutive logic ones or logic zeroes causes the capacitor reference voltage to charge or discharge near the data voltage. The data receiver loses its noise margin and may not be able to detect logic ones or logic zeroes when the capacitor reference voltage approaches either data voltage level.

Hence, a need exists for maintaining a high noise margin by keeping a mid-range value for the capacitor reference voltage even for long series of consecutive logic ones or logic zeroes.

BRIEF DESCRIPTION OF THE DRAWINGS

FIG. 3 is a block diagram of the data receiver of FIG. 1;

FIG. 5 is a block diagram of the encoder of FIG. 1; and

DETAILED DESCRIPTION OF THE PREFERRED EMBODIMENT

Figure 1:
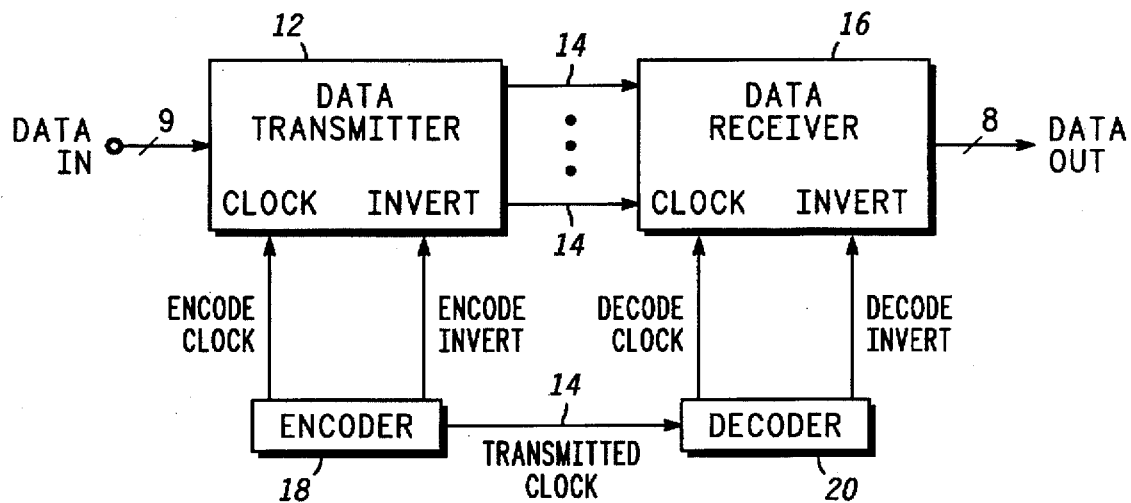
FIG. 1 is a block diagram illustrating a data transmission system.

Referring to FIG. 1, a data communication system 10 is shown. Data transmitter 12 transmits data in parallel over fiber optic channels 14 to data receiver 16. Each optic fiber channel is a thin glass or plastic fiber, ranging from 5.0 microns to 100.0 microns in diameter, that propagates light pulses. In one embodiment there are ten separate fiber optic channels 14; nine for data and parity, and one for the transmitted clock. Alternately, data transmitter 12 can transmit electrical signals over electrical conductors to data receiver 16. Encoder 18 provides an ENCODE CLOCK signal and an ENCODE INVERT signal to data transmitter 12. Encoder 18 also provides a TRANSMITTED CLOCK to decoder 20. Decoder 20 provides a DECODE CLOCK signal and a DECODE INVERT signal to data receiver 16. Further detail of encoder 18 and decoder 20 is discussed below. Data transmitter 12 may be part of a local computer system or telecommunication station, while data receiver 16 is part of a remote computer or telecommunication station. Data transmitter 12 receives a 9-bit parallel digital data word DATA IN (8-bits data and one bit parity) and transmits the data in parallel as light pules over nine separate optical fibers 14. Data receiver 16 receives the nine fiber optical channels and converts the data back to the digital output signal DATA OUT.

Figure 2:
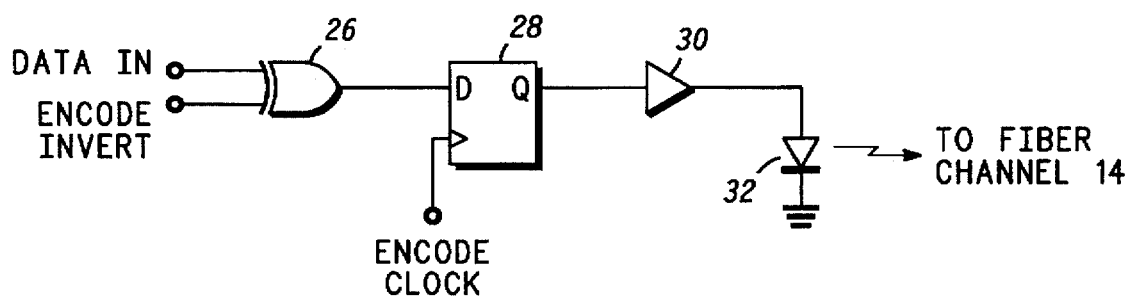
FIG. 2 is a block diagram of the data transmitter of FIG. 1.

Further detail of data transmitter 12 is shown in FIG. 2 including exclusive-OR gate 26 having one input coupled for receiving one bit of the input digital data word. Data transmitter 12 has nine such exclusive-OR gates 26. A second input of each exclusive-OR gate 26 receives the ENCODE INVERT signal. When ENCODE INVERT is logic zero, exclusive-OR gate 26 provides the same state as the data signal at its output. When ENCODE INVERT is logic one, exclusive-OR gate 26 provides the opposite state as the data signal at its output. The output of exclusive-OR gate 26 is coupled to the data input of flipflop 28. Data transmitter 12 has nine such flipflops 28. The clock input of each flipflop 28 receives the ENCODE CLOCK signal. The Q-output of flipflop 28 is coupled to optical driver 30 that provides a drive current into laser diode 32. Laser diode 32 generates light pulses in response to the drive current from optical driver 30. The light pulses transition from a high intensity state indicating a logic one to a low intensity state indicating a logic zero. In order to speed up the data rate, the light emission from laser diode 32 typically is not set to full on for a logic one, or full off for a logic zero. The threshold drive current necessary to turn on laser diode 32 is approximately 2.0 milliamps (ma). A logic zero is the illumination from laser diode 32 with a 2.5 ma drive current given a maximum drive current rating of 5.0 ma. A logic one is the illumination from laser diode 32 with a 4.0 ma drive current. Data transmitter 12 has a circuit as shown in FIG. 2 for each bit of the 9-bit digital data word for transmission along each fiber channels 14.

Data receiver 16 is shown in FIG. 3 including photo diode 36 receiving the light pulses corresponding to the received data signal from one of fiber channels 14. Photo diode 36 generates an electrical current in response to the received light pulses. The current from photo diode 36 is processed through transimpedance amplifier 38 having feedback resistor 40 to develop a voltage at its output. The voltage from amplifier 38 is compared with a voltage stored across capacitor 42 by differential amplifier 44. The differential outputs of amplifier 44 are coupled to differential amplifier 46 that in turn charges and discharges capacitor 42 based on the state of the received data signal. A high state of the received data signal causes the voltage across capacitor 42 to increase. A low state of the received data signal causes the voltage across capacitor 42 to decrease.

Assume an average DC voltage across capacitor 42 midway between its minimum and maximum charge level. If the voltage from amplifier 38 is more than the voltage across capacitor 42, then the non-inverting output of amplifier 44 is greater than its inverting output. The output signal of differential amplifier 50 is high indicating a received logic one. If the voltage from amplifier 38 is less than the voltage across capacitor 42, then the non-inverting output of amplifier 44 is less than its inverting output. The output signal of differential amplifier 50 is low indicating a received logic zero. Circuit elements 36-50 comprise the receiver section of data receiver 16.

Exclusive-OR gate 52 has one input coupled for receiving the output signal from amplifier 50 and a second input receiving the DECODE INVERT signal. When DECODE INVERT is logic zero, exclusive-OR gate 52 provides the same state as the data signal from amplifier 50 at its output. When DECODE INVERT is logic one, exclusive-OR gate 52 provides the opposite state as the data signal from amplifier 50 at its output. The output of exclusive-OR gate 52 is coupled to the data input of flipflop 54. The clock input of flipflop 54 receives the DECODE CLOCK signal. The Q-output of flipflop 54 provides one bit of DATA OUT for data receiver 16. Data receiver 16 has a circuit as shown in FIG. 3 for each bit of the digital data signal received from fiber channels 14.

For proper operation it is important for the voltage across capacitor 42 to stay at some average DC level. If the logic state of the received data signal remains a constant logic one for a period of time, e.g. twenty or more logic ones in a row, then capacitor 42 may charge up to a level approaching the voltage level of a logic one from amplifier 38. Alternately, if the logic state of the received data signal remained a constant logic zero over a period of time, e.g. twenty or more logic zeroes in a row, then capacitor 42 may discharge down to a level approaching the voltage level of a logic zero from amplifier 38. In either case, the receiver circuit loses its noise margin in the ability to detect a logic one or a logic zero because the threshold level stored across capacitor 42 is close to the data voltage level. Amplifier 44 cannot distinguish logic one or logic zero unless the data voltage from amplifier 38 is clearly greater than or less than the threshold level stored across capacitor 42. Data detection errors could result if the voltage across capacitor 42 approaches the voltage levels from amplifier 38 corresponding to logic ones and logic zeroes. Ideally, if the received data signal has a 50% duty cycle, i.e. alternating high-low-high-low, then capacitor 42 is charged as much as it is discharged and therefor remains at an average DC value. The noise margin for detecting either state is maximum when the average DC level remains half way between its overall range.

Unfortunately, the data signals typically do not have an ideal 50% duty cycle. It is common to receive long series of mostly one logic state or the other. As part of the present invention, data receiver 12 scrambles the transmitted data signal so that it inverts the data at regular intervals. The ENCODE INVERT and ENCODE CLOCK control the scrambling of the data bits in data transmitter 12. For example, between times $t_1$ and $t_5$ of FIG. 4, ENCODE INVERT is logic one causing the ENCODED DATA to be the complement of DATA IN by way of exclusive-OR gate 26. Between times $t_5$ and $t_7$ in FIG. 4, ENCODE INVERT is logic zero and the ENCODED DATA is the same state as DATA IN. The regular inversion ensures that long series of data signals having the same logic state are broken up with interspersed opposite logic states so as to avoid charging or discharging capacitor 42 to a level that might adversely effect the noise margin and cause data detection errors.

Assume a long series of logic ones is to be transmitted. Data transmitter 12 inverts certain bits of the data signal so that logic zeroes are transmitted regularly along with the logic ones. The logic zeroes are actually scrambled logic ones and need to be converted back to logic ones in data receiver 16. Alternately, if a long series of logic zeroes is transmitted, data transmitter 12 inverts certain bits of the data signal so that logic ones are transmitted regularly along with the logic zeroes. The logic ones are scrambled logic zeroes and need to be converted back to logic zeroes in data receiver 16. Interspersing one logic state with a scrambled inverted logic state keeps capacitor 42 charged to an average DC value.

The transmitted data stream need not achieve an ideal 50% duty cycle provided there are regular inversions of the data. On the average, multiple logic ones are followed some time later by multiple logic zeroes. The regular inversion causes some of the logic ones to be scrambled as logic zeroes and some of the logic zeroes to be scrambled as logic ones. Capacitor 42 maintains an average DC voltage approximately midway between its minimum and maximum values as data receiver 16 receives regularly interspersed logic ones and logic zeroes in the received data stream.

Figure 4:
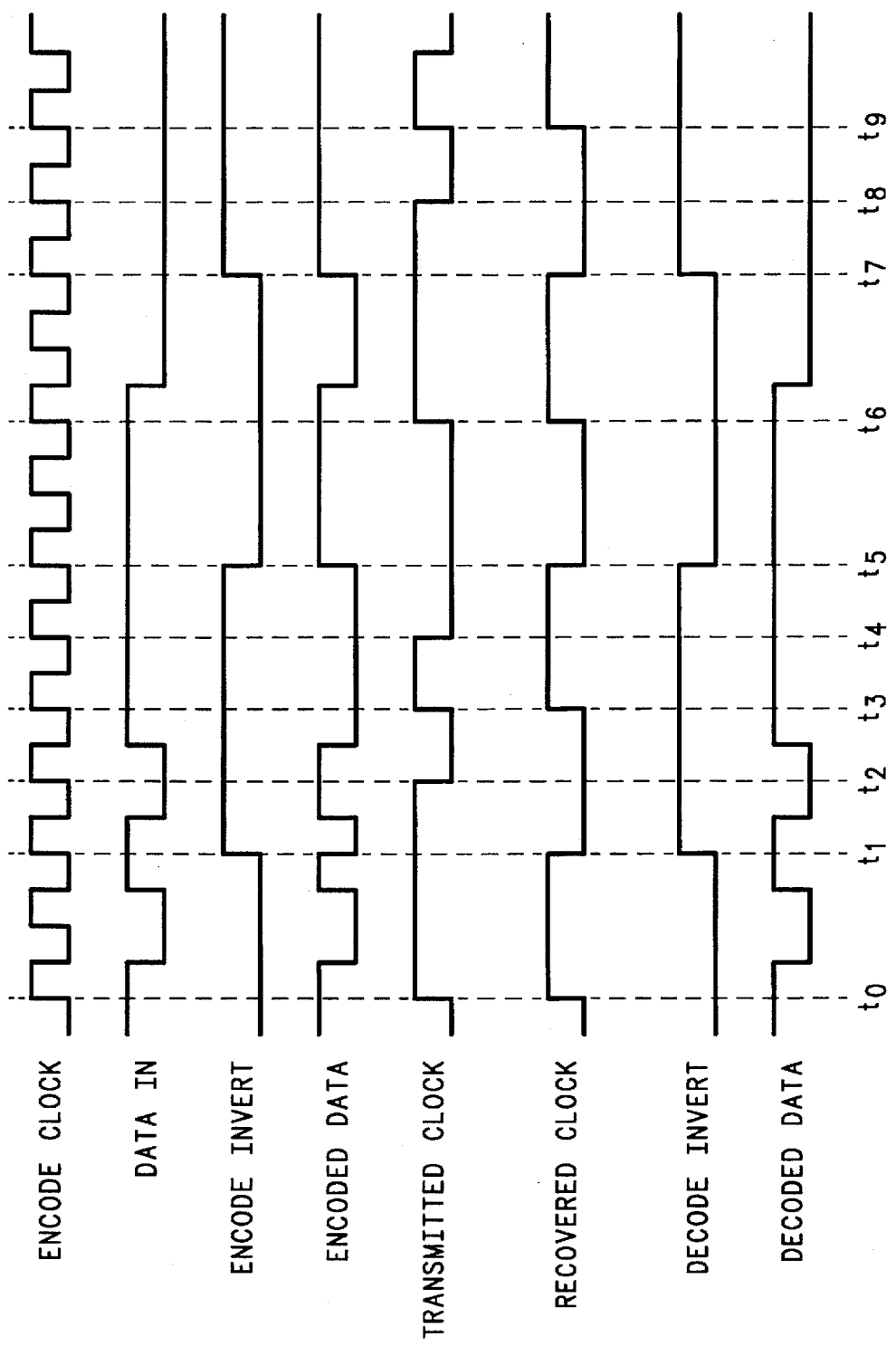
FIG. 4 is a waveform plot useful in the explanation of the present invention.

First consider the encoding algorithm for scrambling the input data. Encoder 18 includes a clock source (not shown) generating ENCODE CLOCK operating at 800 MHz, see FIG. 4. The data rate of DATA IN is 800 MBit/s per channel. ENCODE INVERT controls when to scramble, i.e. invert, the data. There are many different encoding algorithms for regularly inverting the data. In one embodiment, ENCODE INVERT is a divide-by-N of the ENCODE CLOCK as shown in FIG. 4, where "N" is any value, e.g. N=8. Flipflops 60, 62, and 67 in FIG. 5 operate as a divide-by-8 circuit. Just after time $t_1$ in FIG. 4, ENCODE INVERT is logic one. Exclusive-OR gate 26 in FIG. 2 inverts the logic one data signal and provides a logic zero ENCODED DATA to the data input of flipflop 28. The Q-output of flipflop 28 goes to logic zero with the rising edge of ENCODE CLOCK. Optical driver 30 provides a 2.5 ma drive current to laser diode 32 for transmitting a logic zero across fiber optic channel 14, even though the actual data is logic one. During the time that ENCODE INVERT is logic one, exclusive-OR gate 26 complements all bits of DATA IN for transmission over fiber optic channels 14.

As an alternate data encoding algorithm, a random bit generator randomly switches ENCODE INVERT between logic one and logic zero. On the average, the random bit generator makes ENCODE INVERT logic one half the time and logic zero half the time over a long period.

In yet another embodiment, a counter (not shown) keeps track of the number of consecutive logic states. There is one counter for each bit of the input data word. The counters are reset with each change of logic state of the corresponding data bit. If any counter reaches a value of say ten indicating ten consecutive bits with the same logic state, then ENCODE INVERT changes state and all counters are reset. Whatever the encoding algorithm, ENCODE INVERT should be high for about the same amount of time that it is low over a long period.

Data receiver 16 must know which bits are scrambled, i.e. inverted, by data transmitter 12 so that another inversion can take place to get the data back to its original state. The TRANSMITTED CLOCK is encoded by ENCODE INVERT to provide this information. In FIG. 5, ENCODE CLOCK is applied to the clock input of flipflop 60. The Q-output of flipflop 60 is coupled to the data input of flipflop 60. The Q-output of flipflop 60 is coupled to the clock input of flipflop 62 and to one input each of AND gate 64 and OR gate 66. The $\overline{Q}$-output of flipflop 62 is coupled to its data input. The Q-output of flipflop 62 is coupled to second inputs of AND gate 64 and OR gate 66 and to the clock input of flipflop 67. The $\overline{Q}$-output of flipflop 67 is coupled to its data input. The outputs of AND gate 64 and OR gate 66 are coupled to first and second inputs of multiplexer 68. Multiplexer 68 is controlled by ENCODE INVERT from the Q-output of flipflop 67. The output of multiplexer 68 goes to optical driver 70 that provides a drive current into laser diode 72. Laser diode 72 generates light pulses in response to the drive current from optical driver 70. The light pulses transition from a high intensity state indicating a logic one to a low intensity state indicating a logic zero for the TRANSMITTED CLOCK. The data input of flipflop 74 receives ENCODE INVERT from the Q-output of flipflop 67, while the clock input of flipflop 74 is coupled to the Q-output of flipflop 60. The Q-output of flipflop 74 continues the ENCODE INVERT signal to data transmitter 12 following the two ENCODE CLOCKs delay through flipflop 74.

The Q-output of flipflop 60 is one-half the frequency of ENCODE CLOCK. Likewise, the Q-output of flipflop 62 is one-half the frequency of the Q-output of flipflop 60, or one-fourth the frequency of ENCODE CLOCK. The Q-output of flipflop 67 is one-half the frequency of the Q-output of flipflop 62, or one-eighth the frequency of ENCODE CLOCK. The output of AND gate 64 goes to logic one only when the Q-outputs of flipflops 60 and 62 are both logic one. The output of OR gate 66 goes to logic one when either of the Q-outputs of flipflops 60 or 62 is logic one. When ENCODE INVERT is logic zero, multiplexer 68 passes the output signal of AND gate 64. When ENCODE INVERT is logic one, multiplexer 68 passes the output signal of OR gate 66. The resulting waveform from multiplexer 68 is shown as TRANSMITTED CLOCK in FIG. 4.

The TRANSMITTED CLOCK waveform is pulse width modulated with the ENCODE INVERT such that during four ENCODE CLOCK periods, the TRANSMITTED CLOCK is logic one for three periods of ENCODE CLOCK ($t_0$ to $t_2$ and $t_6$ to $t_8$) and logic zero for one period of ENCODE CLOCK ($t_2$ to $t_3$ and $t_8$ to $t_9$) if ENCODE INVERT is logic one. During the next four ENCODE CLOCK periods, the TRANSMITTED CLOCK is logic one for one period of ENCODE CLOCK ($t_3$ to $t_4$) and logic zero for three periods of ENCODE CLOCK ($t_4$ to $t_6$) if ENCODE INVERT is logic zero. TRANSMITTED CLOCK is thus encoded with the data encoding information by ENCODE INVERT. Flipflop 74 delays the ENCODE INVERT for two ENCODE CLOCK periods to give time for TRANSMITTED CLOCK to arrive at decoder 20 and generate DECODE INVERT before the ENCODED DATA arrives at data receiver 16.

Figure 6:
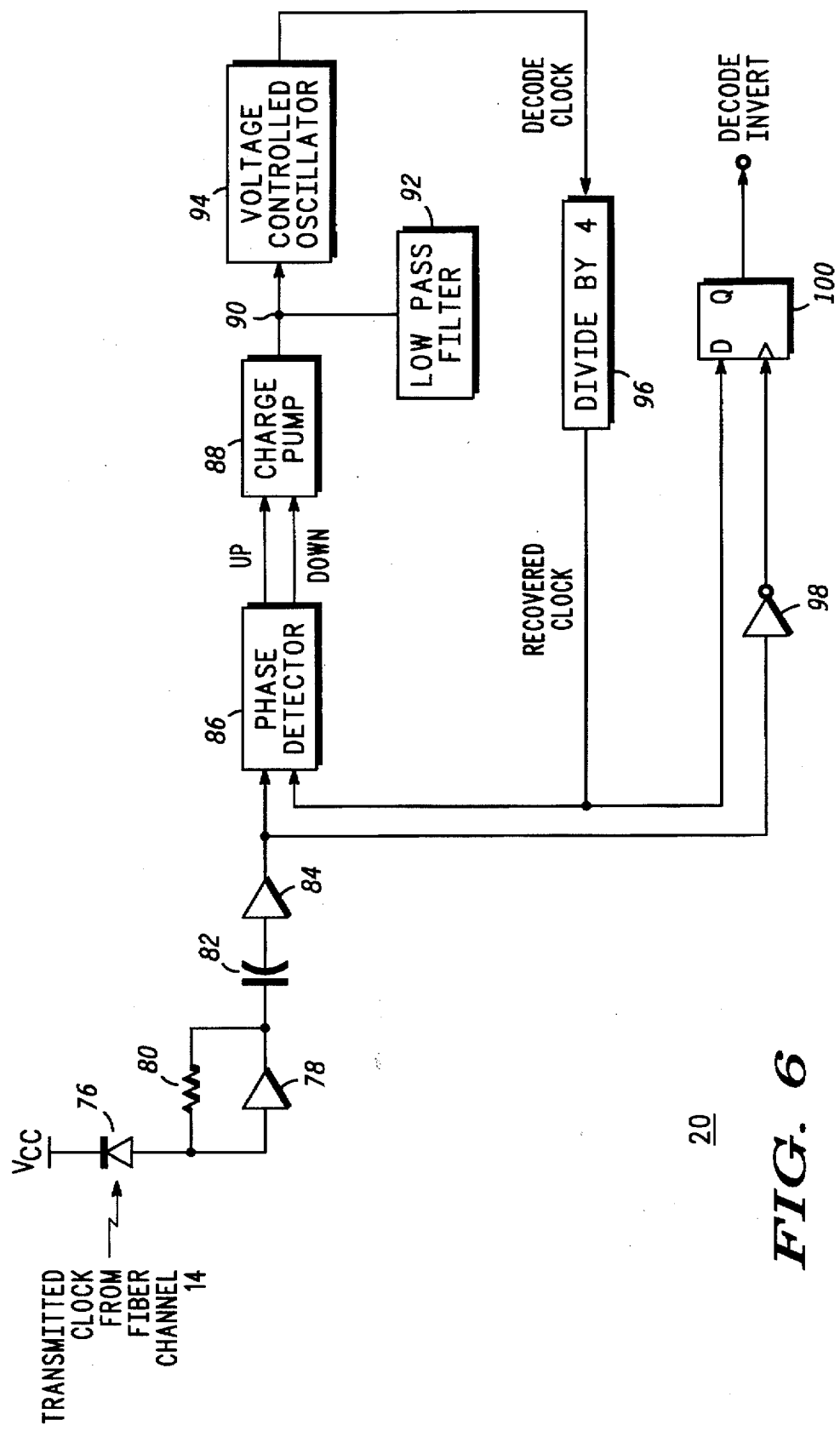
FIG. 6 is a block diagram of the decoder of FIG. 1.

Turning to FIG. 6, the TRANSMITTED CLOCK light pulses are received by photo diode 76. Photo diode 76 generates an electrical current in response to the received light pulses. The current from photo diode 76 is processed through transimpedance amplifier 78 having feedback resistor 80 to develop a voltage at its output. The voltage from amplifier 78 is AC-coupled through capacitor 82 and compared to an internal reference in amplifier 84. The output signal of amplifier 84 is logic high if the voltage at its input is greater than the internal reference, and logic low if the voltage at its input is less than the internal reference. Circuit elements 76–84 comprise the receiver section of decoder 20. In alternate embodiments, the receiver section 36–50 shown in FIG. 3 and the receiver section 76–84 shown in FIG. 4 are interchangeable.

A digital phase lock loop (PLL) is also shown in FIG. 6. The TRANSMITTED CLOCK is applied at a first input of phase detector 86 to generate an UP control signal and a DOWN control signal for charge pump 88. The output of charge pump 88 drives loop node 90 for charging and discharging low-pass loop filter 92 comprising a capacitor (not shown) coupled between loop node 90 and ground potential. The loop voltage at loop node 90 controls voltage controlled oscillator (VCO) 94 for generating the DECODE CLOCK. The DECODE CLOCK is derived from the TRANSMITTED CLOCK and controls the clock input of each flipflop 54 in data receiver 16 to synchronize all eight bits of DATA OUT. The DECODE CLOCK signal is frequency divided by divide-by-4 circuit 96 for providing a RECOVERED CLOCK signal as applied at a second input of phase detector 86. The PLL detects rising edges of TRANSMITTED CLOCK and provides the RECOVERED CLOCK signal as shown in FIG. 4.

An UP control signal increases the loop voltage to increase the output frequency of VCO 94 while a DOWN control signal decreases the loop voltage to decrease the output frequency of VCO 94. The pulse width of the UP and DOWN control signals determines the amount of charge transferred to loop filter 92. The greater the phase difference between the input signal TRANSMITTED CLOCK and RECOVERED CLOCK, the greater the pulse width of the UP or DOWN control signal and the longer the charging current from charge pump 88 works to drive loop node 90 toward a voltage that alters the VCO frequency to minimize the phase difference. Thus, the mutually exclusive UP and DOWN control signals drive VCO 94 to maintain the predetermined phase relationship between the signals applied at the first and second inputs of phase detector 86.

The RECOVERED CLOCK is inverted by inverter 98 and applied to the clock input of flipflop 100. Thus, flipflop 100 clocks off the falling edge of RECOVERED CLOCK. At time $t_1$, flipflop 100 samples the TRANSMITTED CLOCK applied to its data input. The DECODE INVERT goes to logic one at the Q-output of flipflop 100. At time $t_5$, flipflop 100 again samples the TRANSMITTED CLOCK and the DECODE INVERT goes to logic zero. With a logic one DECODE INVERT, exclusive-OR gate 52 inverts the output signal from amplifier 50 in FIG. 3, while a logic zero DECODE INVERT keeps the same logic state. Between times $t_0$ and $t_1$, DECODE INVERT is logic zero so no inversion of the received data takes place. Between times $t_1$ and $t_5$ when DECODE INVERT is logic one, the received data is inverted to decode the transmitted data the which had been previously inverted by data transmitter 12 to average out the number of transmitted logic ones and logic zeroes.

The DATA OUT at the Q-output of flipflop 54 is thus decoded back to the same logic state as DATA IN as seen in FIG. 4.

By now it should be appreciated that the present invention transmits parallel data as light pulses over a plurality of optical channels. The data receiver converts the light pulses back to a voltage level and compares the data voltage level to a reference capacitor voltage. The capacitor voltage should maintain a mid-range value for proper noise margin in detecting logic ones and logic zeroes. Any long series of consecutive logic ones or zeroes causes the capacitor voltage to charge or discharge toward the same level as the data voltage, which causes data errors. To prevent the data errors, the data is encoded by inverting certain bits to break up the long series of consecutive logic ones or zeroes. The encoding information and clock timing are transmitted to the data receiver as a transmitted clock over another fiber optic channel. The encoding information is retrieved so that the encoded data can be decoded back to proper logic states. The transmitted clock also synchronizes the output data.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A data transmission circuit, comprising:

a data transmitter coupled for receiving input data and complementing said input data in response to an encode invert signal for transmission as encoded data over a first channel;

an encoder for generating said encode invert signal to said data transmitter according to an encoding algorithm and transmitting a transmitted clock encoded by said encode invert signal over a second channel;

a data receiver coupled for receiving said encoded data and complementing said encoded data in response to a decode invert signal for providing an output signal of said data receiver; and a decoder coupled for receiving said transmitted clock and recovering said decode invert signal from said transmitted clock.

2. The data transmission circuit of claim 1 wherein said decoder derives a decode clock from said transmitted clock for synchronizing said output signal of said data receiver.

3. The data transmission circuit of claim 2 wherein said first and second channels are optical fibers.

4. The data transmission circuit of claim 2 wherein said first and second channels are electrical conductors.

5. The data transmission circuit of claim 3 wherein said data transmitter includes:

an exclusive-OR gate having a first input coupled for receiving said input data and a second input coupled for receiving said encode invert signal;

a first flipflop having a data input coupled to an output of said exclusive-OR gate and a clock input coupled for receiving an encode clock;

an optical driver having an input coupled to an output of said first flipflop; and a laser diode coupled for receiving a drive current from said optical driver.

6. The data transmission circuit of claim 3 wherein said encoder includes:

a divider circuit coupled for receiving an encode clock and providing first and second divided encode clocks and said encode invert signal;

an AND gate having a first input coupled for receiving said first divided encode clock and a second input coupled for receiving said second divided encode clock;

an OR gate having a first input coupled for receiving said first divided encode clock and a second input coupled for receiving said second divided encode clock;

a multiplexer having a first input coupled to an output of said AND gate, a second input coupled to an output of said OR gate, and a control input coupled for receiving said encode invert signal;

an optical driver having an input coupled to an output of said multiplexer; and a laser diode coupled for receiving a drive current from said optical driver.

7. The data transmission circuit of claim 6 wherein said encoder further includes a first flipflop having a data input coupled for receiving said encode invert signal, a clock input coupled for receiving said first divided encode clock, and an output for delaying said encode invert signal.

8. The data transmission circuit of claim 6 wherein said divider circuit includes:

a first flipflop having a clock input coupled for receiving said encode clock, a data input coupled to an inverted output of said first flipflop, and a non-inverted output for providing said first divided encode clock;

a second flipflop having a clock input coupled to said non-inverted output of said first flipflop, a data input coupled to an inverted output of said second flipflop, and a non-inverted output for providing said second divided encode clock; and a third flipflop having a clock input coupled to said non-inverted output of said second flipflop, a data input coupled to an inverted output of said third flipflop, and a non-inverted output for providing said encode invert signal.

9. The data transmission circuit of claim 2 wherein said data receiver includes:

a first receiver section for converting said encoded data from said first channel to a received digital data signal;

an exclusive-OR gate having a first input coupled to an output of said first receiver section and a second input coupled for receiving said decode invert signal; and a first flipflop having a data input coupled to an output of said exclusive-OR gate, a clock input coupled for receiving said decode clock, and an output for providing said output signal of said data receiver.

10. The data transmission circuit of claim 9 wherein said decoder includes:

a second receiver section for converting said transmitted clock from said second channel to a received digital transmitted clock signal;

a phase detector having a first input coupled to an output of said second receiver section;

a charge pump coupled for receiving first and second control signals from said phase detector and providing a charging current to a loop node;

a low-pass filter coupled to said loop node;

a voltage controlled oscillator having an input coupled to said loop node for providing said decode clock;

a divider circuit having an input coupled for receiving said decode clock and having an output coupled to a second input of said phase detector;

an inverter having an input coupled to said output of said second receiver section; and a first flipflop having a data input coupled to said output of said divider circuit, a clock input coupled to an output of said inverter, and an output for providing said decode invert signal.

11. The data transmission circuit of claim 9 wherein said first receiver section includes:

a photo diode coupled for receiving said encoded data from said first channel and providing a current;

a first amplifier having an input coupled for receiving said current from said photo diode;

a resistor coupled between an output of said first amplifier and said input of said first amplifier;

a capacitor for storing a reference voltage;

a second amplifier having a non-inverting input coupled to said output of said first amplifier and having an inverting input coupled to a terminal of said capacitor;

a third amplifier having a non-inverting input coupled to a non-inverting output of said second amplifier, an inverting input coupled to an inverting output of said second amplifier, and an output coupled to said terminal of said capacitor; and a fourth amplifier having a non-inverting input coupled to said non-inverting output of said second amplifier, an inverting input coupled to said inverting output of said second amplifier, and an output coupled to said first input of said exclusive-OR gate.

12. A method of transmitting encoded data over a channel, comprising the steps of:

complementing input data in response to an encode invert signal for transmission as encoded data over a first channel;

generating said encode invert signal according to an encoding algorithm and transmitting a transmitted clock encoded by said encode invert signal over a second channel;

receiving said encoded data and complementing said encoded data in response to a decode invert signal for providing an output signal; and decoding said transmitted clock to recover said decode invert signal.

13. The method of claim 12 further comprising the step of generating said encode invert signal as a divided encode clock having a predetermined frequency.

14. The method of claim 12 further comprising the step of monitoring said input data and generating said encode invert signal upon detecting a predetermined number of consecutive logic states of said input data.

15. The method of claim 12 further including the step of deriving a decode clock from said transmitted clock for synchronizing said output signal.

16. An integrated data transmission circuit, comprising:

a data transmitter coupled for receiving input data and complementing said input data upon receiving a first state of an encode invert signal for transmission as encoded data over a first channel;

an encoder for generating said encode invert signal to said data transmitter according to an encoding algorithm and transmitting a transmitted clock encoded by said encode invert signal over a second channel;

a data receiver coupled for receiving said encoded data and complementing said encoded data upon receiving a first state of a decode invert signal for providing an output signal of said data receiver; and a decoder coupled for receiving said transmitted clock and recovering said decode invert signal from said transmitted clock.

17. The integrated data transmission circuit of claim 16 wherein said decoder derives a decode clock from said transmitted clock for synchronizing said output signal of said data receiver.

18. The integrated data transmission circuit of claim 17 wherein said first and second channels are optical fibers.

19. The integrated data transmission circuit of claim 18 wherein said data transmitter includes:

an exclusive-OR gate having a first input coupled for receiving said input data and a second input coupled for receiving said encode invert signal;

a first flipflop having a data input coupled to an output of said exclusive-OR gate and a clock input coupled for receiving an encode clock;

an optical driver having an input coupled to an output of said first flipflop; and a laser diode coupled for receiving a drive current from said optical driver.

20. The integrated data transmission circuit of claim 18 wherein said encoder includes:

a divider circuit coupled for receiving an encode clock and providing first and second divided encode clocks and said encode invert signal;

an AND gate having a first input coupled for receiving said first divided encode clock and a second input coupled for receiving said second divided encode clock;

an OR gate having a first input coupled for receiving said first divided encode clock and a second input coupled for receiving said second divided encode clock;

a multiplexer having a first input coupled to an output of said AND gate, a second input coupled to an output of said OR gate, and a control input coupled for receiving said encode invert signal;

an optical driver having an input coupled to an output of said multiplexer;

a laser diode coupled for receiving a drive current from said optical driver; and a first flipflop having a data input coupled for receiving said encode invert signal, a clock input coupled for receiving said first divided encode clock, and an output for delaying said encode invert signal.

21. The integrated data transmission circuit of claim 18 wherein said data receiver includes:

a first receiver section for converting said encoded data from said first channel to a received digital data signal;

an exclusive-OR gate having a first input coupled to an output of said first receiver section and a second input coupled for receiving said decode invert signal; and a first flipflop having a data input coupled to an output of said exclusive-OR gate, a clock input coupled for receiving said decode clock, and an output for providing said output signal of said data receiver.

22. The integrated data transmission circuit of claim 18 wherein said decoder includes:

a second receiver section for converting said transmitted clock from said second channel to a received digital transmitted clock signal;

a phase detector having a first input coupled to an output of said second receiver section;

a charge pump coupled for receiving first and second control signals from said phase detector and providing a charging current to a loop node;

a low-pass filter coupled to said loop node;

a voltage controlled oscillator having an input coupled to said loop node for providing said decode clock;

a divider circuit having an input coupled for receiving said decode clock and having an output coupled to a second input of said phase detector;

an inverter having an input coupled to said output of said second receiver section; and a first flipflop having a data input coupled to said output of said divider circuit, a clock input coupled to an output of said inverter, and an output for providing said decode invert signal.

* * * * *

UNITED STATES PATENT AND TRADEMARK OFFICE
CERTIFICATE OF CORRECTION

PATENT NO. : 5,673,130
DATED : September 30, 1997
INVENTOR(S) : Ray D. Sundstrom et al.

It is certified that error appears in the above-indentified patent and that said Letters Patent is hereby corrected as shown below:

On the Title page, item [54] and Col 1, line 1;
In the patent title, delete "CIRCUITY" and insert --CIRCUIT--.

Signed and Sealed this

Sixteenth Day of December, 1997

Attest:

BRUCE LEHMAN

Attesting Officer     Commissioner of Patents and Trademarks